(12) United States Patent
Sahoo et al.

(10) Patent No.: US 12,243,021 B1
(45) Date of Patent: Mar. 4, 2025

(54) MACHINE LEARNING BASED EMAIL TIME RECOMMENDATION ENGINE

(71) Applicant: HIGHRADIUS CORPORATION, Houston, TX (US)

(72) Inventors: Dibya Prakash Sahoo, Hyderabad (IN); Manish Kumar Choudhary, Hyderabad (IN); Liza Mohanty, Hyderabad (IN); Abhishek Sahu, Hyderabad (IN); Upamanyu Sarangi, Hyderabad (IN)

(73) Assignee: HIGHRADIUS CORPORATION, Houston, TX (US)

( * ) Notice: Subject to any disclaimer, the term of this patent is extended or adjusted under 35 U.S.C. 154(b) by 0 days.

(21) Appl. No.: 18/516,973

(22) Filed: Nov. 22, 2023

(51) Int. Cl.
  *G06Q 10/107* (2023.01)
  *G06Q 10/04* (2023.01)
  *G06Q 40/03* (2023.01)
  *H04L 51/226* (2022.01)

(52) U.S. Cl.
  CPC .......... *G06Q 10/107* (2013.01); *G06Q 10/04* (2013.01); *G06Q 40/03* (2023.01); *H04L 51/226* (2022.05)

(58) Field of Classification Search
  CPC ...... G06Q 10/107; G06Q 40/03; G06Q 10/04; H04L 51/226
  See application file for complete search history.

(56) References Cited

U.S. PATENT DOCUMENTS

| | | | | |
|---|---|---|---|---|
| 9,088,533 B1 * | 7/2015 | Zeng | ...................... | H04L 51/234 |
| 9,282,073 B1 * | 3/2016 | Avital | ................... | H04L 51/226 |
| 10,454,867 B2 * | 10/2019 | Tyagi | ................... | C07D 295/15 |
| 11,989,310 B2 * | 5/2024 | Mammadli | .............. | G06F 21/60 |
| 2013/0166657 A1 * | 6/2013 | Tadayon | ............... | G06Q 10/107 |
| | | | | 709/206 |
| 2015/0381552 A1 * | 12/2015 | Vijay | ..................... | H04L 63/102 |
| | | | | 709/206 |
| 2016/0321562 A1 * | 11/2016 | Zeng | ..................... | H04L 51/214 |
| 2018/0144389 A1 * | 5/2018 | Fredrich | ........... | G06Q 30/0271 |
| 2019/0236643 A1 * | 8/2019 | Achan | ............... | G06Q 30/0255 |
| 2020/0265415 A1 * | 8/2020 | Chattopadhyay | .... | G06Q 20/352 |
| 2021/0103922 A1 * | 4/2021 | Mossoba | .............. | H04L 9/3213 |
| 2021/0110471 A1 * | 4/2021 | Shah | ..................... | G06Q 40/03 |
| 2021/0192412 A1 * | 6/2021 | Krishnaswamy | ............................ | |
| | | | | G06Q 10/06375 |
| 2021/0194843 A1 * | 6/2021 | Vendrow | .............. | H04L 51/234 |

(Continued)

*Primary Examiner* — Chris Parry
*Assistant Examiner* — Hassan A Khan
(74) *Attorney, Agent, or Firm* — Jason C. Cameron

(57) ABSTRACT

A machine learning based computing method for computing optimal time for sending email, is disclosed. The machine learning based computing method includes steps of: receiving inputs from second users; extracting data associated with the first users and the second users from databases, based on the inputs received from the second users; computing electronic mail feature scores based on the extracted data associated with the first users and the second users, for each specified interval of contact prediction window; computing first user electronic mail scores for each specified interval of the contact prediction window based on the electronic mail feature scores for each specified interval of the contact prediction window, using a machine learning model; and computing at least one of: the optimal times and a prioritized list of the optimal times by ranking each specified interval of the contact prediction window associated with the first user electronic mail scores.

18 Claims, 6 Drawing Sheets

(56) References Cited

U.S. PATENT DOCUMENTS

| | | | |
|---|---|---|---|
| 2022/0405775 A1* | 12/2022 | Siebel | G06Q 30/0201 |
| 2023/0048345 A1* | 2/2023 | Cheng | G06Q 40/03 |
| 2023/0129808 A1* | 4/2023 | Yu | G06F 18/214 |
| | | | 709/206 |
| 2023/0412549 A1* | 12/2023 | Lee | H04L 51/42 |

* cited by examiner

MACHINE LEARNING BASED EMAIL TIME RECOMMENDATION ENGINE

FIELD OF INVENTION

Embodiments of the present disclosure relate to machine learning based (ML-based) computing systems, and more particularly relates to a ML-based computing method and system for computing one or more optimal times to transmit one or more electronic mails to first one or more users (e.g., customers or debtors).

BACKGROUND

Debt collection is a process of recovering outstanding payments owed to a creditor. When debt collectors engage in this process, the debt collectors employ one or more techniques to establish contact with and convince debtors to settle their outstanding obligations. The one or more techniques may include at least one of: making phone calls, conducting video conferences, sending letters, and using electronic communication channels including at least one of: electronic mails (e.g., emails) and text messages.

Among the one or more techniques employed by the debt collectors to reach out to debtors (e.g., customers), emails stand out as a prevailing method. The preference of the emails can be attributed to a widespread adoption of the emails as a primary mode of communication in a business arena. Additionally, an email communication is notably cost-efficient when compared to other techniques including at least one of: the phone calls, the video conferences, and a traditional mail.

The expense of sending the emails remains minimal, making it particularly advantageous for extensive debt collection initiatives involving a large debtor base. Moreover, an email correspondence establishes a digital record that serves as documented proof of debt recovery efforts. The documentation plays a pivotal role in legal matters and dispute resolutions, furnishing a transparent trail of communication history. To improve effectiveness and engagement over the emails and reduce the number of follow-ups, the debt collectors utilize a variety of strategies to schedule the emails. Below are some of the traditional techniques used for sending the emails.

Prioritizing based on aging of receivables: The debt collectors frequently utilize age of outstanding receivables as a pivotal factor in deciding when to initiate the email communication. This approach entails classifying overdue invoices according to the number of days the debtors have gone unpaid. For example, reminders through the emails may be programmed to be sent out at intervals including at least one of: 30 days, 60 days, and 90 days after an invoice's due date has lapsed.

Debtor Payment History: Examining a debtor's payment history can offer valuable insights into their payment tendencies. The debt collectors often assess a debtor's past behavior to detect any recurring trends or patterns that can aid in pinpointing an ideal moment to dispatch email reminders. For example, if a debtor consistently makes payments at a specific time during a month, the timing of email reminders can be adjusted accordingly.

Communication Preferences: Certain debtors may have designated their preferred communication channels, which could include the emails, for receiving payment reminders. It is imperative for the debt collectors to honour the preferences of the debtors and customize their email communication accordingly. To determine the most suitable timing for the emails, the debt collector may take into account the debtor's indicated preferred time of day for receiving such notifications.

However, even with careful consideration of timing, the email reminders may not generate desired response rates. The debtors might ignore or overlook these communications, especially if the debtors receive a high volume of the emails or consider the emails as spam. Low response rates can obstruct an effectiveness of debt collection efforts, leading to delayed payments and increased collection costs.

Hence, there is a need for an improved machine learning based (ML-based) computing system, i.e., an email time recommendation engine, and method for computing one or more optimal contact times to communicate with first one or more users, in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a machine-learning based (ML-based) computing method for computing one or more optimal times to transmit one or more electronic mails to a first one or more users, is disclosed. The ML-based computing method includes receiving, by one or more hardware processors, one or more inputs from a second one or more users. The one or more inputs comprises information related to at least one of: one or more entities associated with the first one or more users, and a contact prediction window associated with a predefined time duration during which the second one or more users requires an optimal instance for a communication with the first one or more users.

The ML-based computing method further includes extracting, by the one or more hardware processors, one or more data associated with the first one or more users and the second one or more users from one or more databases, based on the one or more inputs received from the second one or more users.

The ML-based computing method further includes computing, by the one or more hardware processors, one or more electronic mail feature scores based on the extracted one or more data associated with the first one or more users and the second one or more users, for each specified interval of the contact prediction window. The one or more electronic mail feature scores comprises at least one of: incoming electronic mail score, outgoing electronic mail score, first user activity score, electronic mail productivity rate score, quarterly electronic mail productivity score, and incoming electronic mail ratio score.

The ML-based computing method further includes computing, by the one or more hardware processors, one or more first user electronic mail scores for each specified interval of the contact prediction window based on the one or more electronic mail feature scores for each specified interval of the contact prediction window, using a machine learning model.

The ML-based computing method further includes computing, by the one or more hardware processors, at least one of: the one or more optimal times and a prioritized list of the one or more optimal times by ranking each specified interval of the contact prediction window associated with the one or more first user electronic mail scores. In an embodiment, each specified interval comprises at least one of: 30 minutes, one-hour, two-hours, and the like.

The ML-based computing method further includes providing, by the one or more hardware processors, an output of at least one of: the one or more optimal times and the prioritized list of the one or more optimal times to the second one or more users on a user interface associated with one or more electronic devices.

The ML-based computing method further transmitting, by the one or more hardware processors, one or more electronic mails to the first one or more users by scheduling the one or more electronic mails during the one or more optimal times.

In an embodiment, the first one or more users comprises at least one of: one or more individual debtors, one or more organizations, an individual within the one or more organizations, one or more parent companies, one or more subsidiaries, one or more joint ventures, one or more partnerships, and one or more legal entities. In some embodiments, the first one or more users owes at least one of: a financial obligation, liability, debt, and the like. The second one or more users comprises at least one of: one or more data analysts, one or more business analysts, one or more cash analysts, one or more financial analysts, one or more collection analysts, one or more debt collectors, and one or more professionals associated with a cash and collection management.

In another embodiment, the one or more data associated with the first one or more users comprise at least one of: first one or more identifiers corresponding to the first one or more users, the one or more electronic mail identities, one or more timestamps of one or more incoming electronic mails, one or more timestamps of outgoing electronic mails, a nature of a day comprising at least one of: a weekend, a working day, and a holiday based on the one or more timestamps, hourly count of the one or more incoming electronic mails, total count of the one or more incoming electronic mails, hourly count of the one or more outgoing electronic mails, total count of the one or more outgoing electronic mails, one or more timestamps of first user interactions, a number of one or more incoming calls, a number of one or more productive calls, total activity count, productivity ratio, one or more mean response times for the one or more electronic mails, a sum of the one or more mean response times for the one or more electronic mails, a sum of one or more quarterly mean response times for the one or more electronic mails, a number of the one or more incoming electronic mails, a number of the one or more outgoing electronic mails.

The one or more data associated with the second one or more users comprise at least one of: second one or more identifiers corresponding to the second one or more users occupied in one or more activities with the first one or more users, and one or more timestamps when each second user is occupied in the one or more activities with the first one or more users, wherein the one or more activities comprises at least one of: one or more call activities and one or more electronic mail activities.

In yet another embodiment, computing the one or more electronic mail feature scores for each specified interval of the contact prediction window, comprises (a) computing, by the one or more hardware processors, the incoming electronic mail score by dividing a count of the one or more incoming electronic mails received from one or more senders during an hour by cumulative count of the one or more incoming electronic mails received from the one or more senders throughout a total time period, (b) computing, by the one or more hardware processors, the outgoing electronic mail score by dividing a count of the one or more outgoing electronic mails sent by the one or more senders during an hour by cumulative count of the one or more incoming electronic mails sent by the one or more senders throughout the total time period, (c) computing, by the one or more hardware processors, the first user activity score by dividing a sum of at least one of: the one or more incoming calls, the one or more incoming electronic mails, and one or more productive calls reaching productivity call criteria, by a total number of the one or more activities in an hour, (d) computing, by the one or more hardware processors, the electronic mail productivity rate score based on productive ratio, the one or more mean response times for the one or more electronic mails in a conversation string during an hour, and the sum of the one or more mean response times for the one or more electronic mails in one or more conversation strings during the hour, (e) computing, by the one or more hardware processors, the quarterly electronic mail productivity score based on the productive ratio, the one or more mean response times for the one or more electronic mails in the conversation string during the hour, and the sum of the one or more mean response times for the one or more electronic mails in one or more conversation strings during total hours in a corresponding quarter time period of a conversation date, and (f) computing, by the one or more hardware processors, the incoming electronic mail ratio score by dividing the one or more incoming electronic mails from the first one or more users by a total of the one or more incoming electronic mails from the first one or more users and the one or more outgoing electronic mails from the first one or more users.

The one or more senders comprises at least one of: the first one or more users and the second one or more users. The productivity call criteria is associated with at least one of: a duration of one or more conversations between the first one or more users and the second one or more users exceeds at least a predetermined length of time and a presence of one or more system-recorded notes comprising significant actions. In certain embodiments, the predetermined length of time comprises at least one of: 5 seconds, 10 seconds, and the like.

In yet another embodiment, computing, using the machine learning model, the one or more first user electronic mail scores for each specified interval of the contact prediction window based on the one or more electronic mail feature scores, comprises (a) determining, by the one or more hardware processors, one or more weightages for each electronic mail feature score of the one or more electronic mail feature scores using the machine learning model, (b) assigning, by the one or more hardware processors, the determined one or more weightages to the one or more electronic mail feature scores, and (c) aggregating, by the one or more hardware processors, the assigned one or more weightages to the one or more electronic mail feature scores to compute the one or more first user electronic mail scores for each specified interval of the contact prediction window. The machine learning model comprises a gradient descent based machine learning model.

In yet another embodiment, the ML-based computing method further comprises training, by the one or more hardware processors, the machine learning model by at least one of: (a) receiving, by the one or more hardware processors, one or more training datasets associated with the one or more electronic mail feature scores, from an electronic mail feature score computing subsystem, (b) performing, by the one or more hardware processors, forward passes with one or more initial weightages by processing one or more training datasets associated with the one or more electronic mail feature scores, through the machine learning model to compute the one or more first user electronic mail scores for each specified interval of the contact prediction window, (c) executing, by the one or more hardware processors, one or more loss functions comprising at least one of: mean squared error and mean absolute error to determine a difference between the computed one or more first user electronic mail scores and actual one or more first user electronic mail scores, (d) computing, by the one or more hardware processors, gradient of one or more losses for the one or more initial weightages of each electronic mail feature score of the one or more electronic mail feature scores, (e) updating, by the one or more hardware processors, the one or more initial weightages of each electronic mail feature score of the one or more electronic mail feature scores based on the gradient of one or more losses and a learning rate, (f) repeating, by the one or more hardware processors, a process of at least of: performance of the forward passes, the computation of the gradient of one or more losses, updating of the one or more initial weightages, until convergence is achieved, and (g) determining, by the one or more hardware processors, the one or more weightages of each electronic mail feature score of the one or more electronic mail feature scores for the one or more parameters of the machine learning model. The learning rate is determined at a time of training the machine learning model. The learning rate is a hyperparameter in a context of one or more gradient descent rules for training the machine learning model.

In yet another embodiment, the ML-based computing method further comprises validating, by the one or more hardware processors, the machine learning model based on one or more validation datasets. In an embodiment, validating the machine learning model comprises determining, by the one or more hardware processors, whether the machine learning model is trained until the one or more losses reaches a stable state indicating the achieved convergence In yet another embodiment, the ML-based computing method further comprises re-training, by the one or more hardware processors, the machine learning model over a plurality of time intervals based on one or more training data. In an embodiment, re-training the machine learning model over the plurality of time intervals comprises (a) receiving, by the one or more hardware processors, the one or more training data associated with at least one of: the one or more optimal times and the prioritized list of the one or more optimal times, from an output subsystem, (b) adding, by the one or more hardware processors, the one or more training data with the one or more training datasets to generate one or more updated training datasets comprising at least one of: first one or more data points and second one or more data points, (c) re-training, by the one or more hardware processors, the machine learning model to update the one or more weightages by performing the process of at least one of: the performance of the forward passes, the computation of the gradient of one or more losses, updating of the one or more initial weightages, until convergence is achieved, and (d) executing, by the one or more hardware processors, the re-trained machine learning model in a first user electronic mail score computing subsystem to compute the one or more first user electronic mail scores for each specified interval of the contact prediction window over the plurality of time intervals, In yet another embodiment, the one or more data associated with the first one or more users and the second one or more users, are extracted from the one or more databases based on one or more techniques comprising at least one of: data normalization, data anonymization, data aggregation, data analysis, and data storage. The one or more databases comprises at least one of: one or more relational databases, one or more object-oriented databases, one or more data warehouses, and one or more cloud-based databases.

In one aspect, a machine learning based (ML-based) computing system for computing one or more optimal times to transmit one or more electronic mails to a first one or more users, is disclosed. The ML-based computing system, i.e., an email time recommendation engine, includes one or more hardware processors and a memory coupled to the one or more hardware processors. The memory includes a plurality of subsystems in the form of programmable instructions executable by the one or more hardware processors.

The plurality of subsystems includes a data receiving subsystem configured to receive one or more inputs from a second one or more users. The one or more inputs include information related to at least one of: one or more entities associated with a first one or more users and a contact prediction window is associated with a predefined time duration during which the second one or more users requires an optimal instance for a communication with the first one or more users.

The plurality of subsystems further includes a data extraction subsystem configured to extract one or more data associated with the first one or more users and the second one or more users from one or more databases, based on the one or more inputs received from the second one or more users.

The plurality of subsystems further includes an electronic mail feature score computing subsystem configured to compute one or more electronic mail feature scores based on the extracted one or more data associated with the first one or more users and the second one or more users, for each specified interval of the contact prediction window. The one or more electronic mail feature scores comprises at least one of: incoming electronic mail score, outgoing electronic mail score, first user activity score, electronic mail productivity rate score, quarterly electronic mail productivity score, and incoming electronic mail ratio score.

The plurality of subsystems further includes a first user electronic mail score computing subsystem configured to compute one or more first user electronic mail scores for each specified interval of the contact prediction window based on the one or more electronic mail feature scores for each specified interval of the contact prediction window, using a machine learning model.

The plurality of subsystems further includes an optimal time computing subsystem configured to compute at least one of: the one or more optimal times and a prioritized list of the one or more optimal times by ranking each specified interval of the contact prediction window associated with the one or more first user electronic mail scores.

The plurality of subsystems further includes an output subsystem configured to provide an output of at least one of: the one or more optimal times and the prioritized list of the one or more optimal times to the second one or more users on a user interface associated with one or more electronic devices.

The plurality of subsystems further includes an electronic mail scheduler subsystem configured to transmit one or more electronic mails to the first one or more users by scheduling the one or more electronic mails during the one or more optimal times.

In another aspect, a non-transitory computer-readable storage medium having instructions stored therein that, when executed by a hardware processor, causes the processor to perform method steps as described above.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Figure 1:
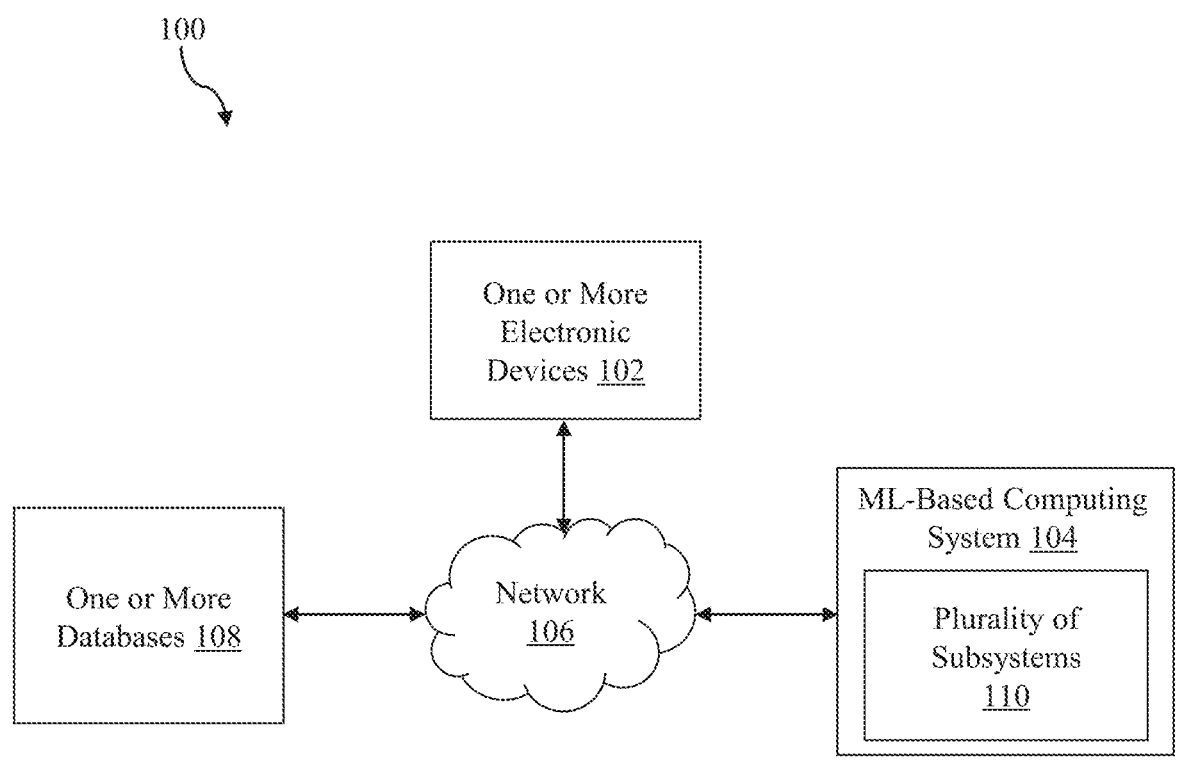
FIG. 1 is a block diagram illustrating a computing environment with a machine learning based (ML-based) computing system, i.e., email time recommendation engine, for computing one or more optimal times to transmit one or more electronic mails to a first one or more users, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module includes dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed, permanently configured (hardwired) or temporarily configured (programmed) to operate in a certain manner and/or to perform certain operations described herein.

Referring now to the drawings, and more particularly to FIG. 1 through FIG. 5, where similar reference characters denote corresponding features consistently throughout the figures, there are shown preferred embodiments and these embodiments are described in the context of the following exemplary system and/or method.

FIG. 1 is a block diagram illustrating a computing environment 100 with a machine learning based (ML-based) computing system 104 for computing one or more optimal times to transmit one or more electronic mails (emails) to a first one or more users, in accordance with an embodiment of the present disclosure. In certain embodiments, the ML-based computing system is an email time recommendation engine. According to FIG. 1, the computing environment 100 includes one or more electronic devices 102 that are communicatively coupled to the ML-based computing system 104 through a network 106. The one or more electronic devices 102 through which a second one or more users provide one or more inputs to the ML-based computing system 104. In an embodiment, the first one or more users may include at least one of: one or more individual debtors, one or more organizations, one or more parent companies, an individual within the one or more organizations, one or more subsidiaries, one or more joint ventures, one or more partnerships, and one or more legal entities. In some embodiments, the first one or more users owes at least one of: a financial obligation, liability, debt, and the like. In another embodiment, the one or more legal entities may include at least one of: one or more corporations, one or more partnerships, one or more governmental bodies, one or more associations, and the like.

In an embodiment, the second one or more users may include at least one of: one or more data analysts, one or more business analysts, one or more cash analysts, one or more financial analysts, one or more collection analysts, one or more debt collectors, one or more professionals associated with a cash and collection management, and the like.

The present invention is configured to compute the one or more one or more optimal times to transmit the one or more electronic mails to the first one or more users (e.g., customers or debtors). The ML-based computing system 104 is initially configured to receive one or more inputs from the second one or more users. In an embodiment, the one or more inputs includes information related to at least one of: one or more entities associated with the first one or more users and a contact prediction window. The contact prediction window (i.e., a prediction window) represents a predefined time duration during which the second one or more users require an optimal instance for a communication with the first one or more users.

The ML-based computing system 104 is further configured to extract one or more data associated with the first one or more users and the second one or more users from one or more databases 108, based on the one or more inputs received from the second one or more users. The ML-based computing system 104 is further configured to compute one or more electronic mail feature scores based on the extracted one or more data associated with the first one or more users and the second one or more users, for each specified interval of the contact prediction window. The one or more contact electronic mail scores includes at least one of: incoming electronic mail (IE) score, outgoing electronic mail (OE) score, first user activity score (e.g., debtor activity (CA) score), electronic mail productivity rate (EPR) score, quarterly electronic mail productivity (QEP) score, and incoming electronic mail ratio (IER) score.

The ML-based computing system 104 is further configured to compute one or more first user electronic mail scores (e.g., one or more debtor electronic mail scores) for each specified interval of the contact prediction window based on the one or more electronic mail feature scores for each specified interval of the contact prediction window, using a machine learning model. The ML-based computing system 104 is further configured to compute at least one of: the one or more optimal times and a prioritized list of the one or more optimal times by ranking each specified interval of the contact prediction window associated with the one or more first user electronic mail scores.

The ML-based computing system 104 is further configured to provide an output of at least one of: the one or more optimal times and the prioritized list of the one or more optimal times to the second one or more users on a user interface associated with the one or more electronic devices 102. The ML-based computing system 104 is further configured to transmit one or more electronic mails to the first one or more users by scheduling the one or more electronic mails during the one or more optimal times.

The ML-based computing system 104 may be hosted on a central server including at least one of: a cloud server or a remote server. Further, the network 106 may be at least one of: a Wireless-Fidelity (Wi-Fi) connection, a hotspot connection, a Bluetooth connection, a local area network (LAN), a wide area network (WAN), any other wireless network, and the like. In an embodiment, the one or more electronic devices 102 may include at least one of: a laptop computer, a desktop computer, a tablet computer, a Smartphone, a wearable device, a Smart watch, and the like.

Further, the computing environment 100 includes the one or more databases 108 communicatively coupled to the ML-based computing system 104 through the network 106. In an embodiment, the one or more databases 108 includes at least one of: one or more relational databases, one or more object-oriented databases, one or more data warehouses, one or more cloud-based databases, and the like. In another embodiment, a format of the one or more data generated from the one or more databases 108 may include at least one of: a comma-separated values (CSV) format, a JavaScript Object Notation (JSON) format, an Extensible Markup Language (XML), spreadsheets, and the like. Furthermore, the one or more electronic devices 102 include at least one of: a local browser, a mobile application, and the like. Furthermore, the second one or more users may use a web application through the local browser, the mobile application to communicate with the ML-based computing system 104. In an embodiment of the present disclosure, the ML-based computing system 104 includes a plurality of subsystems 110. Details on the plurality of subsystems 110 have been elaborated in subsequent paragraphs of the present description with reference to FIG. 2.

Figure 2:
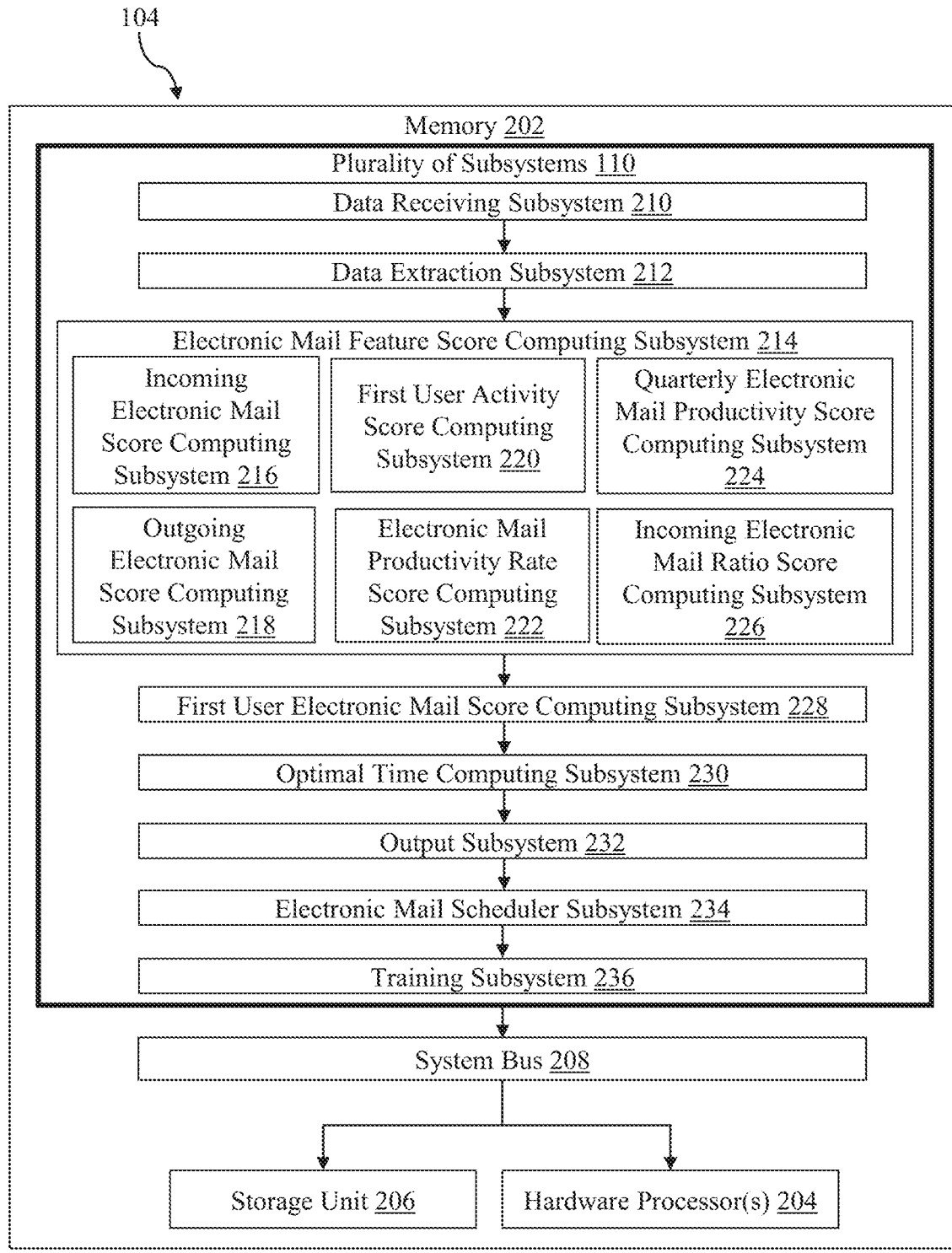
FIG. 2 is a detailed view of the ML-based computing system for computing the one or more optimal times to transmit the one or more electronic mails to the first one or more users, in accordance with another embodiment of the present disclosure.

FIG. 2 is a detailed view of the ML-based computing system 104 for computing the one or more optimal times to transmit the one or more electronic mails to the first one or more users, in accordance with another embodiment of the present disclosure. The ML-based computing system 104 includes a memory 202, one or more hardware processors 204, and a storage unit 206. The one or more hardware processors 204, the memory 202 and the storage unit 206 are communicatively coupled through a system bus 208 or any similar mechanism. The memory 202 includes the plurality of subsystems 110 in the form of programmable instructions executable by the one or more hardware processors 204.

The plurality of subsystems 110 includes a data receiving subsystem 210, a data extraction subsystem 212, an electronic mail feature score computing subsystem 214, a first user electronic mail score computing subsystem 228, an optimal time computing subsystem 230, an output subsystem 232, an electronic mail scheduler subsystem 234, and a training subsystem 236. Further, the electronic mail feature score computing subsystem 214 includes an incoming electronic mail score computing subsystem 216, an outgoing electronic mail score computing subsystem 218, a first user activity score computing subsystem 220, an electronic mail productivity rate score computing subsystem 222, a quarterly electronic mail productivity score computing subsystem 224, and an incoming electronic mail ratio score computing subsystem 226. The brief details of the plurality of subsystems 110 have been elaborated in a below table.

| Plurality of Subsystems 110 | Functionality |
|---|---|
| Data Receiving Subsystem 210 | The data receiving subsystem 210 is configured to receive the one or more inputs from the second one or more users. |
| Data Extraction Subsystem 212 | The data extraction subsystem 212 is configured to extract the one or more data associated with the first one or more users and the second one or more users from the one or more databases 108, based on the one or more inputs received from the second one or more users. |
| Electronic Mail Feature Score Computing Subsystem 214 | The electronic mail feature score computing subsystem 214 is configured to compute one or more electronic mail feature scores based on the extracted one or more electronic mail feature scores based on the extracted one or more data associated with the first one or more users and the second one or more users, for each specified interval of the contact prediction window. The one or more electronic mail feature scores comprises at least one of: the incoming electronic mail (IE) score, the outgoing electronic mail (OE) score, the first user activity score (e.g., debtor activity (CA) score), the electronic mail productivity rate (EPR) score, the quarterly electronic mail productivity (QEP) score, the incoming electronic mail ratio (IER) score, and the like. |
| First User Electronic Mail Score Computing Subsystem 228 | The first user electronic mail score computing subsystem 228 is configured to compute one or more first user electronic mail scores (i.e., one or more debtor electronic mail scores) for each specified interval of the contact prediction window based on the one or more electronic mail feature scores for each specified interval of the contact prediction window, using the machine learning model. In a non-limiting embodiment, each specified interval includes at least one of: 30 minutes, one-hour, two-hours, and the like. |
| Optimal Time Computing Subsystem 230 | The optimal time computing system 230 is configured to compute at least one of: the one or more optimal times and a prioritized list of the one or more optimal times by ranking each specified interval of the contact prediction window associated with the one or more first user electronic mail scores. |
| Output Subsystem 232 | The output subsystem 232 is configured to provide an output of at least one of: the one or more optimal times and the prioritized list of the one or more optimal times to the second one or more users on the user interface associated with the one or more electronic devices 102. |
| Electronic Mail Scheduler Subsystem 234 | The electronic mail scheduler subsystem 234 is configured to transmit the one or more electronic mails to the first one or more users by scheduling the one or more electronic mails during the one or more optimal times. |
| Training Subsystem 236 | The training subsystem 236 is configured to re-train/update the machine learning model over the plurality of time intervals based on one or more training data. |

The one or more hardware processors 204, as used herein, means any type of computational circuit, including, but not limited to, at least one of: a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 204 may also include embedded controllers, including at least one of: generic or programmable logic devices or arrays, application specific integrated circuits, single-chip computers, and the like.

The memory 202 may be non-transitory volatile memory and non-volatile memory. The memory 202 may be coupled for communication with the one or more hardware processors 204, being a computer-readable storage medium. The one or more hardware processors 204 may execute machine-readable instructions and/or source code stored in the memory 202. A variety of machine-readable instructions may be stored in and accessed from the memory 202. The memory 202 may include any suitable elements for storing data and machine-readable instructions, including at least one of: read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 202 includes the plurality of subsystems 110 stored in the form of machine-readable instructions on any of the above-mentioned storage media and may be in communication with and executed by the one or more hardware processors 204.

The storage unit 206 may be a cloud storage, a Structured Query Language (SQL) data store, a noSQL database or a location on a file system directly accessible by the plurality of subsystems 110.

The plurality of subsystems 110 includes the data receiving subsystem 210 that is communicatively connected to the one or more hardware processors 204. The data receiving subsystem 210 is configured to receive the one or more inputs from the second one or more users. In an embodiment, the one or more inputs includes the information related to at least one of the one or more entities associated with the first one or more users, and the contact prediction window associated with a predefined time duration during which the second one or more users requires the optimal instance for a communication with the first one or more users.

For example, if the second one or more users want to compute the one or more optimal times (i.e., one or more optimal debtor times) to contact "ABC Corporation" between August 5 and Aug. 12, 2023, then the second one or more users indicates "ABC Corporation" as the one or more entities and delineates the contact prediction window as Aug. 5 to Aug. 12, 2023. In another example, the second one or more users want to compute the one or more optimal contact times to contact "Mr. XYZ from ABC Corporation", then the second one or more users may indicate "Mr. XYZ" as the one or more entities and delineate the contact prediction window. In certain embodiments, the contact prediction window is predefined or pre-set for the second one or more users. For example, the contact prediction window may be set to the next one month or one year for the second one or more users.

In an embodiment, the first one or more users may include at least one of the one or more individual debtors, the one or more organizations, the one or more parent companies, an individual within the one or more organizations, the one or more subsidiaries, the one or more joint ventures, the one or more partnerships, and the one or more legal entities. In an embodiment, the first one or more users owe at least one of: the financial obligation, the liability, the debt, and the like. In another embodiment, the one or more legal entities may include at least one of the one or more corporations, the one or more partnerships, the one or more governmental bodies, the one or more associations, and the like. In an embodiment, the second one or more users may include at least one of: the one or more data analysts, the one or more business analysts, the one or more cash analysts, the one or more financial analysts, the one or more collection analysts, the one or more debt collectors, the one or more professionals associated with the cash and collection management, and the like.

The plurality of subsystems 110 further includes the data extraction subsystem 212 that is communicatively connected to the one or more hardware processors 204. The data extraction subsystem 212 is configured to extract the one or more data associated with the first one or more users and the second one or more users from the one or more databases 108, based on the one or more inputs received from the second one or more users. In an embodiment, the one or more data associated with the first one or more users include at least one of: first one or more identifiers corresponding to the first one or more users, the one or more electronic mail identities (i.e., unique sender of each incoming electronic mail), one or more timestamps of one or more incoming electronic mails (i.e., a timestamp of when each electronic mail was received or sent), one or more timestamps of outgoing electronic mails, a nature of a day comprising at least one of: a weekend, a working day, and a holiday based on the one or more timestamps, hourly count of the one or more incoming electronic mails (i.e., a number of electronic mails received from each sender during specific hours of the day), total count of the one or more incoming electronic mails (i.e., a cumulative count of the one or more incoming electronic mails received from each sender throughout a total time period), hourly count of the one or more outgoing electronic mails (i.e., a number of the one or more outgoing electronic mails sent by each sender during specific hours of the day), total count of the one or more outgoing electronic mails (i.e., a cumulative count of the one or more electronic mails sent by each sender throughout the total time period), one or more timestamps of first user interactions (i.e., a timestamp of specific hour during which the debtor interactions occurred), a number of one or more incoming calls (i.e., a number of incoming calls received during each hour), a number of one or more productive calls (i.e., a number of productive calls made during the hour defined by a conversation duration exceeding a predetermined length of time or the presence of system-recorded notes outlining significant actions), total activity count (i.e., total count of interactions in a form of the one or more incoming calls, the one or more incoming electronic mails, and one or more productive calls conducted during the hour), productivity ratio (i.e., proportion of the one or more electronic mails within a conversation thread that lead to a productive response from the debtor), one or more mean response times for the one or more electronic mails (i.e., mean response time of the one or more electronic mails within the same conversation thread during the hour), a sum of the one or more mean response times for the one or more electronic mails (i.e., a sum of mean response times for all electronic mails in all conversation threads during the same hour and across all hours), a sum of one or more quarterly mean response times for the one or more electronic mails (i.e., the sum of mean response times for all electronic mails in all conversation threads during the same quarter and across all hours in the respective quarter of a conversation date), a number of the one or more incoming electronic mails (i.e., the number of incoming electronic mails received from every debtor during the hour), a number of the one or more outgoing electronic mails (i.e., the number of outgoing electronic mails sent by every debtor during the hour).

In an embodiment, the one or more data associated with the second one or more users comprise at least one of: second one or more identifiers corresponding to the second one or more users occupied in one or more activities with the first one or more users, and one or more timestamps when each second user is occupied in the one or more activities with the first one or more users. The one or more activities includes at least one of: one or more call activities and one or more electronic mail activities. In an embodiment, the one or more data associated with the first one or more users and the second one or more users, are extracted from the one or more databases 108 based on one or more techniques including at least one of: data normalization, data anonymization, data aggregation, data analysis, data storage for future use, and the like. In an embodiment, the one or more databases 108 includes at least one of: one or more relational databases, one or more object-oriented databases, one or more data warehouses, one or more cloud-based databases, and the like.

The plurality of subsystems 110 further includes the electronic mail feature score computing subsystem 214 that is communicatively connected to the one or more hardware processors 204. The electronic mail feature score computing subsystem 214 is configured to compute one or more electronic mail feature scores based on the extracted one or more data associated with the first one or more users and the second one or more users, for each specified interval of the contact prediction window. In an embodiment, the one or more electronic mail feature scores comprises at least one of: the incoming electronic mail (IE) score, the outgoing electronic mail (OE) score, the first user activity score (e.g., debtor activity (CA) score), the electronic mail productivity rate (EPR) score, the quarterly electronic mail productivity (QEP) score, and the incoming electronic mail ratio (IER) score.

The electronic mail feature score computing subsystem 214 includes the incoming electronic mail score computing subsystem 216 that is communicatively connected to the one or more hardware processors 204. In other words, the incoming electronic mail score computing subsystem 216 is a subsystem of the electronic mail feature score computing subsystem 214. The incoming electronic mail score computing subsystem 216 is configured to quantify a proportion of incoming electronic mails during specific hours of a day for one or more senders, categorized by the nature of the day as either a weekend, holiday, or working day. The incoming electronic mail score computing subsystem 216 is configured to compute the incoming electronic mail score by dividing a count of the one or more incoming electronic mails received from the one or more senders during a designated hour by cumulative one or more incoming electronic mails (i.e., a total number of one or more incoming electronic mails) received from the one or more senders throughout a total time period. For a given hour, the incoming electronic mail score is computed as the ratio of the number of the one or more incoming electronic mails received in that hour to the total number of the one or more incoming electronic mails across all hours. The incoming electronic mail score provides a normalized representation of the temporal distribution of the one or more incoming electronic mails from each sender of the one or more senders.

In a non-limiting example, on a particular weekday, if a recipient received a total of 50 incoming electronic mails from a sender over a duration of 15 days. Out of these, 20 electronic mails arrived during the 10 AM to 11 AM time slot. The "incoming electronic mail at 10 AM" parameter is computed by: (number of electronic mails at 10 AM)/(total number of electronic mails over 15 days). Therefore, incoming electronic mail at 10 AM=20/50=0.4. In another non-limiting example, on a particular weekend day, if a recipient received a total of 70 incoming electronic mails from a sender over 15 days. Out of these, 25 electronic mails arrived during the 2 PM to 3 PM slot. The "incoming electronic mail at 2 PM" parameter is computed by: (number of electronic mails at 2 PM)/(total number of electronic mails for 15 days). Therefore, incoming electronic mails at 2 PM=25/70=0.357. In an embodiment, the sender may include at least one of: the first one or more users and the second one or more users. In another embodiment, the recipient may include at least one of: the first one or more users and the second one or more users. In yet another embodiment, the sender may be the first one or more users when the recipient may be the second one or more users. In yet another embodiment, the sender may be the second one or more users when the recipient may be the first one or more users.

The electronic mail feature score computing subsystem 214 further includes the outgoing electronic mail score computing subsystem 218 that is communicatively connected to the one or more hardware processors 204. In other words, the outgoing electronic mail score computing subsystem 218 is a subsystem of the electronic mail feature score computing subsystem 214. The outgoing electronic mail score computing subsystem 218 is configured to quantify a proportion of outgoing electronic mails during specific hours of a day for the one or more senders, categorized by the nature of the day as either a weekend, holiday, or working day. The outgoing electronic mail score computing subsystem 218 is configured to compute the outgoing electronic mail score by dividing a count of the one or more outgoing electronic mails sent by the one or more senders during a designated hour by cumulative one or more outgoing electronic mails (i.e., a total number of one or more outgoing electronic mails) sent by the one or more senders throughout a total time period (e.g., 15 days). For a given hour, the outgoing electronic mail score is computed as the ratio of the number of the one or more outgoing electronic mails sent in that hour to the total number of the one or more outgoing electronic mails across all hours. The outgoing electronic mail score provides a normalized representation of the temporal distribution of the one or more outgoing electronic mails from each sender of the one or more senders.

In a non-limiting example, on a particular weekday, if a sender sent a total of 60 outgoing electronic mails over a duration of 15 days. Out of these, 15 electronic mails were sent during the 9 AM to 10 AM time slot. The "outgoing electronic mail at 9 AM" parameter is computed by: (number of electronic mails sent at 9 AM)/(total number of electronic mails sent over 15 days). Therefore, outgoing electronic mail at 9 AM=15/60=0.25. In another non-limiting example, on a particular weekend day, if a sender sent a total of 80 outgoing electronic mails over 15 days. Out of these, 30 electronic mails were sent during the 4 PM to 5 PM slot. The "outgoing electronic mail at 4 PM" parameter is computed by: (number of electronic mails at 4 PM)/(total number of electronic mails for 15 days). Therefore, outgoing electronic mails at 4 PM=30/80=0.375.

The electronic mail feature score computing subsystem 214 further includes the first user activity score computing subsystem 220 that is communicatively connected to the one or more hardware processors 204. In other words, the first user activity score computing subsystem 220 is a subsystem of the electronic mail feature score computing subsystem 214. The first user activity score computing subsystem 220 is configured to quantify a level of debtor engagement within a specific hour. The first user activity score computing subsystem 220 is configured to compute the first user activity score (i.e., debtor activity (CA) score) as a percentage and is configured to reflect the debtor's interactions during that hour. To compute the first user activity score, the one or more incoming calls received, the one or more incoming electronic mails received, and one or more productive calls made within the hour are summed up. In an embodiment, the productive call is defined by meeting productive call criteria including at least one of: a conversation duration exceeding a predetermined length of time and a presence of system-recorded notes outlining significant actions. In certain embodiments, the predetermined length of time includes at least one of: 5 seconds, 10 seconds, and the like.

The first user activity score computing subsystem 220 is configured to compute the first user activity score by dividing a sum of at least one of the one or more incoming calls, the one or more incoming electronic mails, and one or more productive calls reaching productivity call criteria, by a total number of the one or more activities (e.g., electronic mails and calls conducted) in an hour.

In a non-limiting example, if there were 7 incoming calls, 12 incoming electronic mails and 3 productive calls conducted during an hour and a total activity count of 230 interactions in the hour. The first user activity score is computed as follows: (7+12+3)/230)=0.095. In another non-limiting example, if there were 5 incoming calls, 8 incoming electronic mails and 2 productive calls conducted during an hour and a total activity count of 150 interactions in the hour. The first user activity score is computed as follows: (5+8+2)/150)=0.08. In yet another non-limiting example, if there were 10 incoming calls, 15 incoming electronic mails and 5 productive calls conducted during an hour and a total activity count of 300 interactions in the hour. The first user activity score is computed as follows: (10+15+5)/300)=0.1.

The electronic mail feature score computing subsystem 214 further includes the electronic mail productivity rate score computing subsystem 222 that is communicatively connected to the one or more hardware processors 204. In other words, the electronic mail productivity rate score computing subsystem 222 is a subsystem of the electronic mail feature score computing subsystem 214. The electronic mail productivity rate score computing subsystem 222 is configured to assess an efficiency of the one or more electronic mails send by the second one or more users (e.g., the debt collectors) based on responsiveness of the first one or more users (e.g., the debtors). The electronic mail productivity rate score is computed as a combination of the productive ratio and the responsiveness of the one or more electronic mails within a conversation thread during a specific hour.

The productive ratio reflects the proportion of the one or more electronic mails within a conversation thread that lead to a productive response from the first one or more users. Additionally, the mean response time of the one or more electronic mails within the same conversation thread is compared with the average mean response time for all conversation threads during the hour (i.e., nth hour). In an embodiment, the second component of the electronic mail productivity rate score formula normalizes the comparison of response times.

In an embodiment, the formula to compute the electronic mail productivity rate (EPR) score is given as:

Electronic mail productivity rate (EPR) score=Productive Ratio+(1−Mean response time for all electronic mails in the conversation thread during the nth hour/Sum of Mean response time for all electronic mails in all conversation threads during the nth hour)   Eqn (1)

In a non-limiting example, the sum of mean response times for all electronic mails in all conversation threads during the nth hour is 450 seconds, and the productive ratio for the conversation thread in the nth hour is 0.3. Furthermore, if the sum of mean response times for all electronic mails in all conversation threads across all hours is 3000 seconds, the Electronic mail productivity rate (EPR) score is computed as:

Electronic mail productivity rate (EPR) score=0.3+(1−450/3000)=1.15

In another non-limiting example, the sum of mean response times for all electronic mails in all conversation threads during the nth hour is 600 seconds, and the productive ratio for the conversation thread in the nth hour is 0.4. Furthermore, if the sum of mean response times for all electronic mails in all conversation threads across all hours is 4000 seconds, the Electronic mail productivity rate (EPR) score is computed as:

Electronic mail productivity rate (EPR) score=0.4+(1−600/4000)=1.25

In yet another non-limiting example, the sum of mean response times for all electronic mails in all conversation threads during the nth hour is 300 seconds, and the productive ratio for the conversation thread in the nth hour is 0.2. Furthermore, if the sum of mean response times for all electronic mails in all conversation threads across all hours is 2500 seconds, the Electronic mail productivity rate (EPR) score is computed as:

Electronic mail productivity rate (EPR) score=0.2+(1−300/2500)=1.08

The electronic mail feature score computing subsystem 214 further includes the quarterly electronic mail productivity score computing subsystem 224. In other words, the quarterly electronic mail productivity score computing subsystem 224 is a subsystem of the electronic mail feature score computing subsystem 214. The quarterly electronic mail productivity score computing subsystem 224 is configured to assess an efficiency of the one or more electronic mails sent by the second one or more users (e.g., the debt collectors) on a quarterly basis by evaluating responsiveness of debtor responses (i.e., responses from the first one or more users) to the one or more electronic mails. The quarterly electronic mail productivity (QEP) score is computed as a combination of the productive Ratio and the responsiveness of one or more electronic mails within conversation threads during specific hours.

The productive ratio reflects the proportion of the one or more electronic mails within a conversation thread that lead to a productive response from the first one or more users. Additionally, the mean response time of the one or more electronic mails within the same conversation thread is compared with the average mean response time for all conversation threads during the hour (i.e., nth hour). In an embodiment, the second component of the quarterly electronic mail productivity (QEP) score formula normalizes the comparison of response times.

In an embodiment, the formula to compute the quarterly electronic mail productivity (QEP) score is given as:

Quarterly electronic mail productivity (QEP) score=Productive Ratio+(1−Mean response time for all electronic mails in the conversation thread during the nth hour/Sum of Mean response time for all electronic mails in all conversation threads during all hours in the respective quarter of the conversation date)   Eqn (2)

In a non-limiting example, the sum of mean response times for all electronic mails in all conversation threads during the nth hour is 450 seconds, the productive ratio for the conversation thread in the nth hour is 0.3, and the sum of mean response times for all electronic mails in all conversation threads during all hours in the respective quarter of the conversation date is 4600 seconds, the quarterly electronic mail productivity (QEP) score is computed as:

Quarterly electronic mail productivity (QEP) score=0.3+(1−450/4600)=1.2

In another non-limiting example, the sum of mean response times for all electronic mails in all conversation threads during the nth hour is 600 seconds, the productive ratio for the conversation thread in the nth hour is 0.25, and the sum of mean response times for all electronic mails in all conversation threads during all hours in the respective quarter of the conversation date is 5000 seconds, the quarterly electronic mail productivity (QEP) score is computed as:

Quarterly electronic mail productivity (QEP) score=0.25+(1−600/5000)=1.13

In yet another non-limiting example, the sum of mean response times for all electronic mails in all conversation threads during the nth hour is 400 seconds, the productive ratio for the conversation thread in the nth hour is 0.4, and the sum of mean response times for all electronic mails in all conversation threads during all hours in the respective quarter of the conversation date is 3500 seconds, the quarterly electronic mail productivity (QEP) score is computed as:

Quarterly electronic mail productivity (QEP) score=0.4+(1−400/3500)=1.2857

The electronic mail feature score computing subsystem 214 further includes the incoming electronic mail ratio score computing subsystem 226 that is communicatively connected to the one or more hardware processors 204. In other words, the incoming electronic mail ratio score computing subsystem 226 is a subsystem of the electronic mail feature score computing subsystem 214. The incoming electronic mail ratio score computing subsystem 226 is configured to compute the proportion of the one or more incoming electronic mails from each debtor during each hour, relative to the total electronic mail activity (i.e., both incoming and outgoing electronic mails) from the debtor during the same hour. The incoming electronic mail ratio score computing subsystem 226 is configured to provide insights into the concentration of the one or more incoming electronic mails within the overall electronic mail engagement for individual debtors.

In an embodiment, a formula to compute the incoming electronic mail ratio (IER) score is given as:

Incoming electronic mail ratio (IER) score=Incoming electronic mail in each hour from every debtor/ Total of incoming and outgoing electronic mails in each hour from every debtor     Eqn (3)

In a non-limiting example, if the number of incoming electronic mails received from every debtor during the nth hour is 400, and the number of outgoing electronic mails from every debtor during the same hour is 350, the incoming electronic mail ratio (IER) score is computed as Incoming electronic mail ratio (IER) score=400/ (400+350)=0.53

In another non-limiting example, if the number of incoming electronic mails received from every debtor during the nth hour is 300, and the number of outgoing electronic mails from every debtor during the same hour is 200, the incoming electronic mail ratio (IER) score is computed as:

Incoming electronic mail ratio (IER) score=300/ (300+200)=0.6

In yet another non-limiting example, if the number of incoming electronic mails received from every debtor during the nth hour is 450, and the number of outgoing electronic mails from every debtor during the same hour is 550, the incoming electronic mail ratio (IER) score is computed as:

Incoming electronic mail ratio (IER) score=450/ (450+550)=0.45

The plurality of subsystems 110 includes the first user electronic mail score computing subsystem 228 (i.e., a debtor electronic mail score generation subsystem) that is communicatively connected to the one or more hardware processors 204. The first user electronic mail score computing subsystem 228 is configured to compute one or more first user electronic mail scores (i.e., one or more debtor electronic mail scores) for each specified interval of the contact prediction window based on the one or more electronic mail feature scores for each specified interval of the contact prediction window, using the machine learning model.

For computing the one or more first user electronic mail scores for each specified interval of the contact prediction window, the first user electronic mail score computing subsystem 228 is initially configured to determine one or more weightages for each electronic mail feature score of the one or more electronic mail feature scores using the machine learning model. In an embodiment, the machine learning model may be a gradient descent based machine learning model. The first user electronic mail score computing subsystem 228 is further configured to assign the determined one or more weightages to the one or more electronic mail feature scores. The first user electronic mail score computing subsystem 228 is further configured to aggregate (i.e., sum) the assigned one or more weightages to the one or more electronic mail feature scores to compute the one or more first user electronic mail scores for each specified interval of the contact prediction window.

In an embodiment, the computation of the one or more first user electronic mail scores (i.e., the one or more debtor electronic mail scores) for each specified interval of the contact prediction window and computation of the one or more optimal times to transmit the one or more electronic mails to the first one or more users, are not static activities. Specifically, the computer-implemented system 104 and applications are configured to monitor the one or more debtor data from the one or more databases 108 or one or more information sources to determine a status of the first one or more users as the computer-implemented system 104 evolves through a plurality of time intervals.

The plurality of subsystems 110 includes the training subsystem 236 that is communicatively connected to the one or more hardware processors 204. The training subsystem 236 is configured to train the machine learning model for computing the one or more first user electronic mail scores (i.e., the one or more debtor electronic mail scores) for each specified interval of the contact prediction window.

The machine learning model is initially configured to receive one or more training datasets associated with the one or more electronic mail feature scores, from the electronic mail feature score computing subsystem 214. For training the machine learning model, one or more initial weightages are assigned as given in a below table.

| Inputs to first user electronic mail score computing subsystem 228 | Initial weight |
|---|---|
| Incoming electronic mail (IE) score computing subsystem 216 | 1 |
| Outgoing electronic mail (OE) score computing subsystem 218 | 0.8 |
| First user activity score (i.e., debtor activity (CA) score) computing subsystem 220 | 0.6 |
| Electronic mail productivity rate (EPR) score computing subsystem 222 | 0.4 |
| Quarterly electronic mail productivity (QEP) score computing subsystem 224 | 0.2 |
| Incoming electronic mail ratio (IER) score computing subsystem 226 | 0.1 |

In an embodiment, the prepared one or more training datasets includes multiple input-output pairs. The one or more training datasets includes one or more input features, including, but not limited to the incoming electronic mail (IE) scores, the outgoing electronic mail (OE) scores, the first user activity scores (i.e., debtor activity (CA) scores), the electronic mail productivity rate (EPR) scores, the quarterly electronic mail productivity (QEP) scores, and the incoming electronic mail ratio (IER) scores. The input features are appropriately mapped to the output of the one or more first user electronic mail scores (e.g., the debtor electronic mail scores). The one or more training datasets are shuffled and divided into training and validation datasets for training the machine learning model.

In another embodiment, the one or more input features are scaled or normalized to ensure stable training. In yet another embodiment, anomalies are removed. In yet another embodiment, outliers, errors, or mislabelled data are removed or corrected to ensure that the one or more training datasets are robust for training.

The machine learning model is configured to perform forward passes with the one or more initial weightages by processing the one or more training datasets associated with the one or more electronic mail feature scores, through the machine learning model to compute the one or more first user electronic mail scores for each specified interval of the contact prediction window. The machine learning model is further configured to execute one or more loss functions including at least one of: mean squared error (MSE) and mean absolute error (MAE) to determine a difference between the computed one or more first user electronic mail scores and actual one or more first user electronic mail scores.

The machine learning model is further configured to compute gradients of one or more losses for the one or more initial weightages of each electronic mail feature score of the one or more electronic mail feature scores. The machine learning model is further configured to update the one or more initial weightages of each electronic mail feature score of the one or more electronic mail feature scores based on the gradient of one or more losses and a learning rate. In an embodiment, the learning rate is determined at a time of training the machine learning model. In another embodiment, the learning rate is a hyperparameter in a context of one or more gradient descent rules for training the machine learning model. In yet another embodiment, the learning rate is configured to determine a step size at which the one or more gradient descent rules updates one or more parameters of the machine learning model in a direction that reduces the one or more loss functions.

The machine learning model is further configured to repeat a process of at least of: performance of the forward passes, the computation of the gradient of one or more losses, updating of the one or more initial weightages, until convergence is achieved. The convergence is achieved when the one or more losses is reduced significantly. The machine learning model is further configured to determine the one or more weightages of each electronic mail feature score of the one or more electronic mail feature scores for the one or more parameters of the machine learning model. After completing the specified number of iterations or achieving convergence, the one or more weightages for one or more parameters, selected from the incoming electronic mail (IE) scores, the outgoing electronic mail (OE) scores, the first user activity scores (i.e., debtor activity (CA) scores), the electronic mail productivity rate (EPR) scores, the quarterly electronic mail productivity (QEP) scores, and the incoming electronic mail ratio (IER) scores that best approximate the machine learning model are achieved.

The training subsystem 236 is further configured to validate the machine learning model based on one or more validation datasets. In an embodiment, the machine learning model is validated by the training system 230 by determining whether the machine learning model is trained until the one or more losses reaches a stable state indicating the achieved convergence. In other words, the validation of the machine learning model is executed using the one or more validation datasets, and training the machine learning model continues until the validation loss reaches a plateau, indicating satisfactory convergence. In an embodiment, adjustments to the learning rate during training are feasible to enhance convergence efficiency. Upon achieving a plateaued validation loss, the machine learning model is deemed trained. To assess the machine learning model's generalization capability, the machine learning model is subsequently evaluated on an independent test set, demonstrating performance of the machine learning model on previously unseen data.

The plurality of subsystems 110 includes the optimal time computing subsystem 230 that is communicatively connected to the one or more hardware processors 204. The optimal time computing subsystem 230 is configured to compute at least one of: the one or more optimal times and a prioritized list of the one or more optimal times by ranking each specified interval of the contact prediction window associated with the one or more first user electronic mail scores. In an embodiment, each specified interval comprises at least one of: 30 minutes, one-hour, two-hours, and the like. In an embodiment, each specified interval of the contact prediction window associated with the one or more first user electronic mail scores, is ranked in a descending order according to the one or more first user electronic mail scores for each specified interval of the contact prediction window. In an embodiment, the second one or more users may have an option to select an appropriate optimal time from the prioritized list of the one or more optimal times computed/generated by the optimal time computing subsystem 230.

In a non-limiting example, if one or more first user electronic mail scores for: (a) 11 AM to 12 PM time slot on 5th August is 4, (b) 12 PM to 1 PM time slot on 5th August is 2.5, and (c) 1 PM to 2 PM time slot on 5th August is 5.5, then 1 PM to 2 PM time slot on 5th August is the optimal time to transmit the one or more electronic mails to the first one or more users.

The plurality of subsystems 110 includes the output subsystem 232 that is communicatively connected to the one or more hardware processors 204. The output subsystem 232 is configured to provide an output of at least one of: the one or more optimal times and the prioritized list of the one or more optimal times to the second one or more users on the user interface associated with the one or more electronic devices 102.

The plurality of subsystems 110 includes the electronic mail scheduler subsystem 234 that is communicatively connected to the one or more hardware processors 204. The electronic mail scheduler subsystem 234 is configured to transmit the one or more electronic mails to the first one or more users by scheduling the one or more electronic mails during the one or more optimal times. In an embodiment, the electronic mail scheduler subsystem 234 is configured to accommodate the one or more optimal times or the prioritized list of the one or more optimal times. Further, the electronic mail scheduler subsystem 234 is adaptive to debtor preferences for receiving the one or more electronic mails at a particular time frame or window. For example, some debtors may indicate that the electronic mail should be sent between 10 AM and 4 PM. In another example, some debtors may indicate that the electronic mail should be sent only on weekdays.

The training subsystem 236 is configured to re-train/update the machine learning model over the plurality of time intervals based on one or more training data. For re-training/updating the machine learning model over the plurality of time intervals, the training subsystem 236 is configured to receive the one or more training data associated with at least one of: the one or more optimal times and the prioritized list of the one or more optimal times, from the output subsystem 232. The training subsystem 236 is further configured to add the one or more training data with the one or more training datasets to generate one or more updated training datasets including at least one of: first one or more data points and second one or more data points.

The training subsystem 236 is further configured to re-train/update the machine learning model to update the one or more weightages by performing the process of at least one of: the performance of the forward passes, the computation of the gradient of one or more losses, updating of the one or more initial weightages, until convergence is achieved. The training subsystem 236 is further configured to execute the re-trained/updated machine learning model in the first user electronic mail score computing subsystem 228 to compute the one or more first user electronic mail scores for each specified interval of the contact prediction window over the plurality of time intervals.

Figure 3:
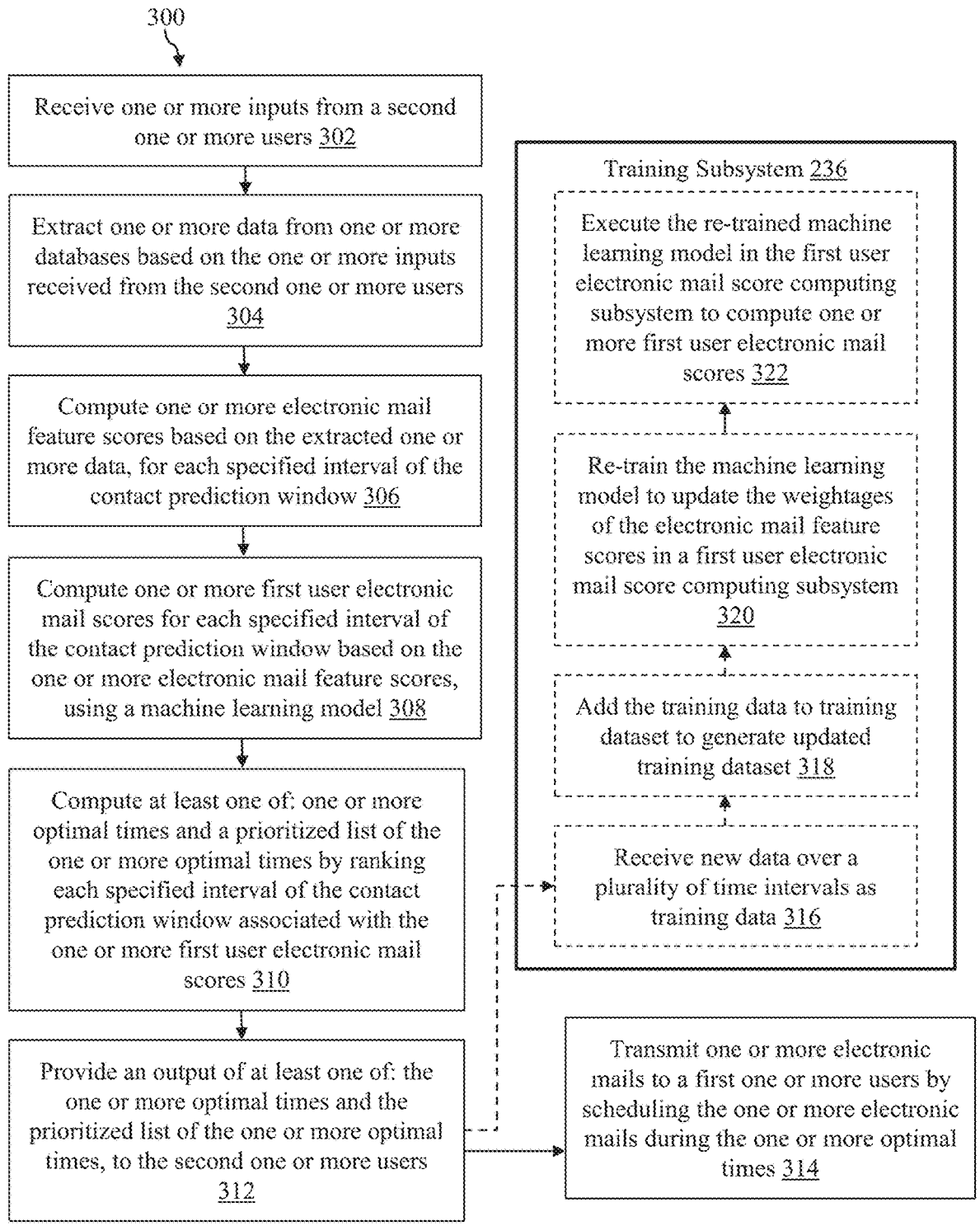
FIG. 3 is an overall process flow of computing the one or more optimal times to transmit the one or more electronic mails to the first one or more users, in accordance with another embodiment of the present disclosure.

FIG. 3 is an overall process flow 300 of computing the one or more optimal times to transmit the one or more electronic mails to the first one or more users, in accordance with another embodiment of the present disclosure. At step 302, the one or more inputs is received from the second one or more users. In an embodiment, the one or more inputs includes the information related to at least one of: the one or more entities associated with the first one or more users and the contact prediction window. The contact prediction window (i.e., the prediction window) represents the predefined time duration during which the second one or more users require the optimal instance for the communication with the first one or more users.

At step 304, the one or more data associated with the first one or more users and the second one or more users are extracted from the one or more databases 108, based on the one or more inputs received from the second one or more users.

At step 306, the one or more electronic mail feature scores is computed based on the extracted one or more data associated with the first one or more users and the second one or more users, for each specified interval of the contact prediction window. In an embodiment, the one or more electronic mail feature scores includes at least one of the incoming electronic mail (IE) score, the outgoing electronic mail (OE) score, the first user activity score (i.e., debtor activity (CA) score), the electronic mail productivity rate (EPR) score, the quarterly electronic mail productivity (QEP) score, and the incoming electronic mail ratio (IER) score.

At step 308, the one or more first user electronic mail scores (e.g., the one or more debtor electronic mail scores) is computed for each specified interval of the contact prediction window based on the one or more electronic mail feature scores for each specified interval of the contact prediction window, using the machine learning model. At step 310, at least one of: the one or more optimal times and the prioritized list of the one or more optimal times, is computed by ranking each specified interval of the contact prediction window associated with the one or more first user electronic mail scores.

At step 312, the output of at least one of: the one or more optimal times and the prioritized list of the one or more optimal times to the second one or more users on the user interface associated with the one or more electronic devices 102. At step 314, the one or more electronic mails are transmitted to the first one or more users by scheduling the one or more electronic mails during the one or more optimal times.

At step 316, the one or more training data associated with at least one of: the one or more optimal times and the prioritized list of the one or more optimal times, are received from the output subsystem 232. At step 318, the one or more training data are added with the one or more training datasets to generate one or more updated training datasets. At step 320, the machine learning model is re-trained to update the one or more weightages by performing the process of at least one of: the performance of the forward passes, the computation of the gradient of one or more losses, updating of the one or more initial weightages, until convergence is achieved. At step 322, the re-trained/updated machine learning model is executed in the first user electronic mail score computing subsystem 228 to compute the one or more first user electronic mail scores for each specified interval of the contact prediction window over the plurality of time intervals.

Figure 4:
FIG. 4 is an exemplary graphical representation of an output of at least one of: the one or more optimal times and a prioritized list of the one or more optimal times to a second one or more users on a user interface, in accordance with an embodiment of the present disclosure.

FIG. 4 is an exemplary graphical representation 400 of an output of at least one of: the one or more optimal times and a prioritized list of the one or more optimal times to the second one or more users on the user interface, in accordance with an embodiment of the present disclosure. The graphical representation 400 shows the optimal time 402 to transmit the one or more electronic mails to the debtor (e.g., XYZ). The graphical representation 400 further shows an electronic mail composer field 404, an invoice list field 406, and a recommendation field 408 showing the best time to send/transmit the one or more electronic mails to the first one or more users (e.g., the debtors).

Figure 5:
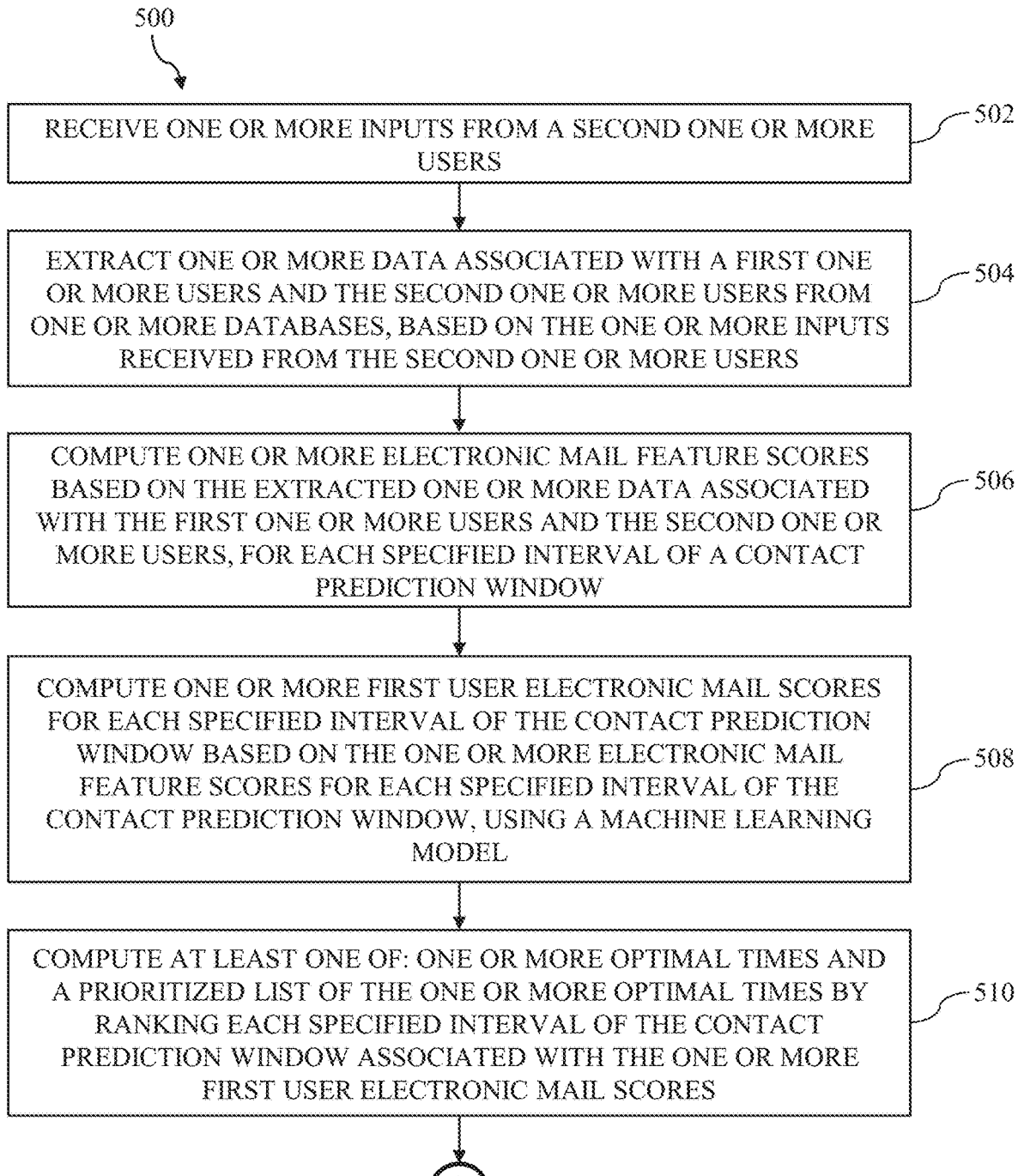
FIG. 5 is a flow chart illustrating a machine-learning based (ML-based) computing method for computing the one or more optimal times to transmit the one or more electronic mails to the first one or more users, in accordance with an embodiment of the present disclosure.
Figure 5:
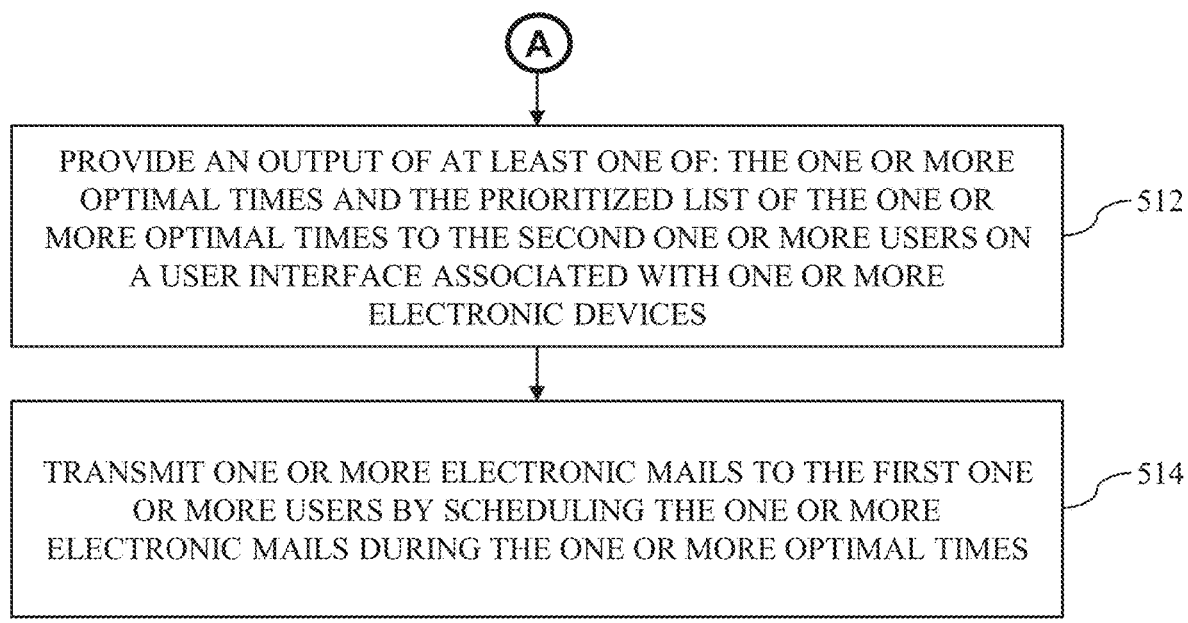

FIG. 5 is a flow chart illustrating a machine-learning based (ML-based) computing method 500 for computing the one or more optimal times to transmit the one or more electronic mails to the first one or more users, in accordance with an embodiment of the present disclosure.

At step 502, the one or more inputs is received from the second one or more users. In an embodiment, the one or more inputs includes the information related to at least one of: the one or more entities associated with the first one or more users and the contact prediction window. The contact prediction window (i.e., the prediction window) represents the predefined time duration during which the second one or more users require the optimal instance for the communication with the first one or more users.

At step 504, the one or more data associated with the first one or more users and the second one or more users, is extracted from the one or more databases 108, based on the one or more inputs received from the second one or more users.

At step 506, the one or more contact electronic mail scores are computed based on the extracted one or more data associated with the first one or more users and the second one or more users, for each specified interval of the contact prediction window. In an embodiment, the one or more contact electronic mail scores includes at least one of: the incoming electronic mail (IE) score, the outgoing electronic mail (OE) score, the first user activity score (e.g., debtor activity (CA) score), the electronic mail productivity rate (EPR) score, the quarterly electronic mail productivity (QEP) score, and the incoming electronic mail ratio (IER) score.

At step 508, the one or more first user electronic mail scores (e.g., the one or more debtor electronic mail scores) is computed for each specified interval of the contact prediction window based on the one or more electronic mail feature scores for each specified interval of the contact prediction window, using the machine learning model. At step 510, at least one of: the one or more optimal times and the prioritized list of the one or more optimal times, is computed by ranking each specified interval of the contact prediction window associated with the one or more first user electronic mail scores.

At step 512, the output of at least one of the one or more optimal times and the prioritized list of the one or more optimal times to the second one or more users on the user interface associated with the one or more electronic devices 102. At step 514, the one or more electronic mails are transmitted to the first one or more users by scheduling the one or more electronic mails during the one or more optimal times. In FIG. 5, the circular symbol with "A" written inside is being used as an off-page connector. This is used for indicating that FIG. 5 continues in the next page.

The present invention has the following advantages. The present invention with the ML-based computing system 104 is configured to recommend the one or more optimal times to the second one or more users to transmit the one or more electronic mails to the first one or more users. The ML-based computing system 104 and the ML-based computing method 500 aim at maximizing the chances of successfully collecting outstanding debts while maintaining a positive debtor experience. The present invention has developed the electronic mail scheduler subsystem 234 (e.g., a machine learning based electronic mail scheduler subsystem) for scheduling the one or more electronic mails at the optimal time to improve debtor engagement in debt collection practices.

Further, the present invention is used to assess the availability of the first one or more users (e.g., debtor's availability) within the contact prediction window, based on the one or more optimal times. The present invention is used to determine the schedule and commitments of the first one or more users to ascertain the mutual availability, preventing scheduling conflicts, which guarantees the efficient connection point.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer-readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the ML-based computing system 104 either directly or through intervening I/O controllers. Network adapters may also be coupled to the ML-based computing system 104 to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/ML-based computing system 104 in accordance with the embodiments herein. The ML-based computing system 104 herein comprises at least one processor or central processing unit (CPU). The CPUs are interconnected via system bus 208 to various devices including at least one of: a random-access memory (RAM), read-only memory (ROM), and an input/output (I/O) adapter. The I/O adapter can connect to peripheral devices, including at least one of: disk units and tape drives, or other program storage devices that are readable by the ML-based computing system 104. The ML-based computing system 104 can read the inventive instructions on the program storage devices and follow these instructions to execute the methodology of the embodiments herein.

The ML-based computing system 104 further includes a user interface adapter that connects a keyboard, mouse, speaker, microphone, and/or other user interface devices including a touch screen device (not shown) to the bus to gather user input. Additionally, a communication adapter connects the bus to a data processing network, and a display adapter connects the bus to a display device which may be embodied as an output device including at least one of: a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that are issued on an application based here on. Accordingly, the embodiments of the present invention are intended to be illustrative, but not limiting, of the scope of the invention, which is set forth in the following claims.

What is claimed is:

1. A machine-learning based (ML-based) computing method for computing one or more optimal times to transmit one or more electronic mails to a first one or more users, the ML-based computing method comprising:
    receiving, by one or more hardware processors, one or more inputs from a second one or more users, wherein the one or more inputs comprises information related to at least one of: one or more entities associated with the first one or more users, and a contact prediction window associated with a predefined time duration during which the second one or more users requires an optimal instance for a communication with the first one or more users;
    extracting, by the one or more hardware processors, one or more data associated with the first one or more users and the second one or more users from one or more databases, based on the one or more inputs received from the second one or more users;
    computing, by the one or more hardware processors, one or more electronic mail feature scores based on the extracted one or more data associated with the first one or more users and the second one or more users, for each specified interval of the contact prediction window, wherein the one or more electronic mail feature scores comprises at least one of: incoming electronic mail score, outgoing electronic mail score, first user activity score, electronic mail productivity rate score, quarterly electronic mail productivity score, and incoming electronic mail ratio score;
    computing, by the one or more hardware processors, one or more first user electronic mail scores for each specified interval of the contact prediction window based on the one or more electronic mail feature scores for each specified interval of the contact prediction window, using a machine learning model;
    validating, by the one or more hardware processors, the machine learning model based on one or more validation datasets, wherein in validating the machine learning model comprises determining, by the one or more hardware processors, whether the machine learning model is trained until one or more losses reaches a stable state indicating a state of convergence is achieved;
    computing, by the one or more hardware processors, at least one of: the one or more optimal times and a prioritized list of the one or more optimal times by ranking each specified interval of the contact prediction window associated with the one or more first user electronic mail scores;
    providing, by the one or more hardware processors, an output of at least one of: the one or more optimal times and the prioritized list of the one or more optimal times to the second one or more users on a user interface associated with one or more electronic devices; and
    transmitting, by the one or more hardware processors, one or more electronic mails to the first one or more users by scheduling the one or more electronic mails during the one or more optimal times.

2. The machine-learning based (ML-based) computing method of claim 1, wherein:
    the first one or more users comprises at least one of: one or more individual debtors, one or more organizations, one or more parent companies, an individual within the one or more organizations, one or more subsidiaries, one or more joint ventures, one or more partnerships, and one or more legal entities; and
    the second one or more users comprises at least one of: one or more data analysts, one or more business analysts, one or more cash analysts, one or more financial analysts, one or more collection analysts, one or more debt collectors, and one or more professionals associated with a cash and collection management.

3. The machine-learning based (ML-based) computing method of claim 1, wherein:
    the one or more data associated with the first one or more users comprise at least one of: first one or more identifiers corresponding to the first one or more users, the one or more electronic mail identities, one or more timestamps of one or more incoming electronic mails, one or more timestamps of outgoing electronic mails, a nature of a day comprising at least one of: a weekend, a working day, and a holiday based on the one or more timestamps, hourly count of the one or more incoming electronic mails, total count of the one or more incoming electronic mails, hourly count of the one or more outgoing electronic mails, total count of the one or more outgoing electronic mails, one or more timestamps of first user interactions, a number of one or more incoming calls, a number of one or more productive calls, total activity count, productivity ratio, one or more mean response times for the one or more electronic mails, a sum of the one or more mean response times for the one or more electronic mails, a sum of one or more quarterly mean response times for the one or more electronic mails, a number of the one or more incoming electronic mails, a number of the one or more outgoing electronic mails; and
    the one or more data associated with the second one or more users comprise at least one of: second one or more identifiers corresponding to the second one or more users occupied in one or more activities with the first one or more users, and one or more timestamps when each second user is occupied in the one or more activities with the first one or more users, wherein the one or more activities comprises at least one of: one or more call activities and one or more electronic mail activities.

4. The machine-learning based (ML-based) computing method of claim 1, wherein computing the one or more electronic mail feature scores for each specified interval of the contact prediction window, comprises:
    computing, by the one or more hardware processors, the incoming electronic mail score by dividing a count of the one or more incoming electronic mails received from one or more senders during an hour by cumulative count of the one or more incoming electronic mails received from the one or more senders throughout a total time period;

computing, by the one or more hardware processors, the outgoing electronic mail score by dividing a count of the one or more outgoing electronic mails sent by the one or more senders during an hour by cumulative count of the one or more incoming electronic mails sent by the one or more senders throughout the total time period, wherein the one or more senders comprises at least one of: the first one or more users and the second one or more users;

computing, by the one or more hardware processors, the first user activity score by dividing a sum of at least one of: the one or more incoming calls, the one or more incoming electronic mails, and one or more productive calls reaching productivity call criteria, by a total number of the one or more activities in an hour, wherein the productivity call criteria is associated with at least one of: a duration of one or more conversations between the first one or more users and the second one or more users exceeds at least a predetermined length of time and a presence of one or more system-recorded notes comprising significant actions;

computing, by the one or more hardware processors, the electronic mail productivity rate score based on productive ratio, the one or more mean response times for the one or more electronic mails in a conversation string during an hour, and the sum of the one or more mean response times for the one or more electronic mails in one or more conversation strings during the hour;

computing, by the one or more hardware processors, the quarterly electronic mail productivity score based on the productive ratio, the one or more mean response times for the one or more electronic mails in the conversation string during the hour, and the sum of the one or more mean response times for the one or more electronic mails in one or more conversation strings during total hours in a corresponding quarter time period of a conversation date; and computing, by the one or more hardware processors, the incoming electronic mail ratio score by dividing the one or more incoming electronic mails from the first one or more users by a total of the one or more incoming electronic mails from the first one or more users and the one or more outgoing electronic mails from the first one or more users.

5. The machine-learning based (ML-based) computing method of claim 1, wherein computing, using the machine learning model, the one or more first user electronic mail scores for each specified interval of the contact prediction window based on the one or more electronic mail feature scores, comprises:
determining, by the one or more hardware processors, one or more weightages for each electronic mail feature score of the one or more electronic mail feature scores using the machine learning model, wherein the machine learning model comprises a gradient descent based machine learning model;
assigning, by the one or more hardware processors, the determined one or more weightages to the one or more electronic mail feature scores;
aggregating, by the one or more hardware processors, the assigned one or more weightages to the one or more electronic mail feature scores to compute the one or more first user electronic mail scores for each specified interval of the contact prediction window.

6. The machine-learning based (ML-based) computing method of claim 5, further comprising training, by the one or more hardware processors, the machine learning model by at least one of:
receiving, by the one or more hardware processors, one or more training datasets associated with the one or more electronic mail feature scores, from an electronic mail feature score computing subsystem;
performing, by the one or more hardware processors, forward passes with one or more initial weightages by processing one or more training datasets associated with the one or more electronic mail feature scores, through the machine learning model to compute the one or more first user electronic mail scores for each specified interval of the contact prediction window;
executing, by the one or more hardware processors, one or more loss functions comprising at least one of: mean squared error and mean absolute error to determine a difference between the computed one or more first user electronic mail scores and actual one or more first user electronic mail scores;
computing, by the one or more hardware processors, a gradient of one or more losses for the one or more initial weightages of each electronic mail feature score of the one or more electronic mail feature scores;
updating, by the one or more hardware processors, the one or more initial weightages of each electronic mail feature score of the one or more electronic mail feature scores based on the gradient of one or more losses and a learning rate, wherein the learning rate is determined at a time of training the machine learning model, and wherein the learning rate is a hyperparameter in a context of one or more gradient descent rules for training the machine learning model;
repeating, by the one or more hardware processors, a process of at least of: performance of the forward passes, the computation of the gradient of one or more losses, updating of the one or more initial weightages, until the convergence is achieved; and
determining, by the one or more hardware processors, the one or more weightages of each electronic mail feature score of the one or more electronic mail feature scores for the one or more parameters of the machine learning model.

7. The machine-learning based (ML-based) computing method of claim 1, further comprising re-training, by the one or more hardware processors, the machine learning model over a plurality of time intervals based on one or more training data, wherein re-training the machine learning model over the plurality of time intervals comprises:
receiving, by the one or more hardware processors, the one or more training data associated with at least one of: the one or more optimal times and the prioritized list of the one or more optimal times, from an output subsystem;
adding, by the one or more hardware processors, the one or more training data with the one or more training datasets to generate one or more updated training datasets comprising at least one of: first one or more data points and second one or more data points;
re-training, by the one or more hardware processors, the machine learning model to update the one or more weightages by performing the process of at least one of: the performance of the forward passes, the computation of the gradient of one or more losses, updating of the one or more initial weightages, until the convergence is achieved: and executing, by the one or more hardware processors, the re-trained machine learning model in a first user electronic mail score computing subsystem to compute the one or more first user electronic mail scores for each specified interval of the contact prediction window over the plurality of time intervals.

8. The machine-learning based (ML-based) computing method of claim 1, wherein the one or more data associated with the first one or more users and the second one or more users, are extracted from the one or more databases based on one or more techniques comprising at least one of: data normalization, data anonymization, data aggregation, data analysis, and data storage; and wherein the one or more databases comprises at least one of: one or more relational databases, one or more object-oriented databases, one or more data warehouses, and one or more cloud-based databases.

9. A machine learning based (ML-based) computing system for computing one or more optimal times to transmit one or more electronic mails to a first one or more users, the ML-based computing system comprising:

one or more hardware processors;

a memory coupled to the one or more hardware processors, wherein the memory comprises a plurality of subsystems in form of programmable instructions executable by the one or more hardware processors, and wherein the plurality of subsystems comprises:

a data receiving subsystem configured to receive one or more inputs from a second one or more users, wherein the one or more inputs comprises information related to at least one of:

one or more entities associated with the first one or more users, and a contact prediction window associated with a predefined time duration during which the second one or more users requires an optimal instance for a communication with the first one or more users;

a data extraction subsystem configured to extract one or more data associated with the first one or more users and the second one or more users from one or more databases, based on the one or more inputs received from the second one or more users;

an electronic mail feature score computing subsystem configured to compute one or more electronic mail feature scores based on the extracted one or more data associated with the first one or more users and the second one or more users, for each specified interval of the contact prediction window, wherein the one or more electronic mail feature scores comprises at least one of: incoming electronic mail score, outgoing electronic mail score, first user activity score, electronic mail productivity rate score, quarterly electronic mail productivity score, and incoming electronic mail ratio score;

a first user electronic mail score computing subsystem configured to compute one or more first user electronic mail scores for each specified interval of the contact prediction window based on the one or more electronic mail feature scores for each specified interval of the contact prediction window, using a machine learning model;

a training subsystem configured to validate the machine learning model based on one or more validation datasets, wherein in validating the machine learning model, the training subsystem is configured to determine whether the machine learning model is trained until one or more losses reaches a stable state indicating a state of convergence is achieved;

an optimal time computing subsystem configured to compute at least one of: the one or more optimal times and a prioritized list of the one or more optimal times by ranking each specified interval of the contact prediction window associated with the one or more first user electronic mail scores;

an output subsystem configured to provide an output of at least one of: the one or more optimal times and the prioritized list of the one or more optimal times to the second one or more users on a user interface associated with one or more electronic devices; and an electronic mail scheduler subsystem configured to transmit one or more electronic mails to the first one or more users by scheduling the one or more electronic mails during the one or more optimal times.

10. The machine-learning based (ML-based) computing system of claim 9, wherein:

the first one or more users comprises at least one of: one or more individual debtors, one or more organizations, one or more parent companies, an individual within the one or more organizations, one or more subsidiaries, one or more joint ventures, one or more partnerships, and one or more legal entities; and the second one or more users comprises at least one of: one or more data analysts, one or more business analysts, one or more cash analysts, one or more financial analysts, one or more collection analysts, one or more debt collectors, and one or more professionals associated with a cash and collection management.

11. The machine-learning based (ML-based) computing system of claim 9, wherein:

the one or more data associated with the first one or more users comprise at least one of: first one or more identifiers corresponding to the first one or more users, the one or more electronic mail identities, one or more timestamps of one or more incoming electronic mails, one or more timestamps of outgoing electronic mails, a nature of a day comprising at least one of: a weekend, a working day, and a holiday based on the one or more timestamps, hourly count of the one or more incoming electronic mails, total count of the one or more incoming electronic mails, hourly count of the one or more outgoing electronic mails, total count of the one or more outgoing electronic mails, one or more timestamps of first user interactions, a number of one or more incoming calls, a number of one or more productive calls, total activity count, productivity ratio, one or more mean response times for the one or more electronic mails, a sum of the one or more mean response times for the one or more electronic mails, a sum of one or more quarterly mean response times for the one or more electronic mails, a number of the one or more incoming electronic mails, a number of the one or more outgoing electronic mails; and the one or more data associated with the second one or more users comprise at least one of: second one or more identifiers corresponding to the second one or more users occupied in one or more activities with the first one or more users, and one or more timestamps when each second user is occupied in the one or more activities with the first one or more users, wherein the one or more activities comprises at least one of: one or more call activities and one or more electronic mail activities.

12. The machine-learning based (ML-based) computing system of claim 9, wherein in computing the one or more electronic mail feature scores for each specified interval of the contact prediction window, the electronic mail feature score computing subsystem is configured to:
compute, by an incoming electronic mail score computing subsystem of the electronic mail feature score computing subsystem, the incoming electronic mail score by dividing a count of the one or more incoming electronic mails received from one or more senders during an hour by cumulative count of the one or more incoming electronic mails received from the one or more senders throughout a total time period;
compute, by an outgoing electronic mail score computing subsystem of the electronic mail feature score computing subsystem, the outgoing electronic mail score by dividing a count of the one or more outgoing electronic mails sent by the one or more senders during an hour by cumulative count of the one or more incoming electronic mails sent by the one or more senders throughout the total time period, wherein the one or more senders comprises at least one of: the first one or more users and the second one or more users;
compute, by a first user activity score computing subsystem of the electronic mail feature score computing subsystem, the first user activity score by dividing a sum of at least one of: the one or more incoming calls, the one or more incoming electronic mails, and one or more productive calls reaching productivity call criteria, by a total number of the one or more activities in an hour, wherein the productivity call criteria is associated with at least one of: a duration of one or more conversations between the first one or more users and the second one or more users exceeds at least a predetermined length of time and a presence of one or more system-recorded notes comprising significant actions;
compute, by an electronic mail productivity rate score computing subsystem of the electronic mail feature score computing subsystem, the electronic mail productivity rate score based on productive ratio, the one or more mean response times for the one or more electronic mails in a conversation string during an hour, and the sum of the one or more mean response times for the one or more electronic mails in one or more conversation strings during the hour; and
compute, by a quarterly electronic mail productivity score computing subsystem of the electronic mail feature score computing subsystem, the quarterly electronic mail productivity score based on the productive ratio, the one or more mean response times for the one or more electronic mails in the conversation string during the hour, and the sum of the one or more mean response times for the one or more electronic mails in one or more conversation strings during total hours in a corresponding quarter time period of a conversation date; and
compute, by an incoming electronic mail ratio score computing subsystem of the electronic mail feature score computing subsystem, the incoming electronic mail ratio score by dividing the one or more incoming electronic mails from the first one or more users by a total of the one or more incoming electronic mails from the first one or more users and the one or more outgoing electronic mails from the first one or more users.

13. The machine-learning based (ML-based) computing system of claim 10, wherein in computing, using the machine learning model, the one or more first user electronic mail scores for each specified interval of the contact prediction window based on the one or more electronic mail feature scores, the first user electronic mail score computing subsystem is configured to:
determine one or more weightages for each electronic mail feature score of the one or more electronic mail feature scores using the machine learning model, wherein the machine learning model comprises a gradient descent based machine learning model;
assign the determined one or more weightages to the one or more electronic mail feature scores;
aggregate the assigned one or more weightages to the one or more electronic mail feature scores to compute the one or more first user electronic mail scores for each specified interval of the contact prediction window.

14. The machine-learning based (ML-based) computing system of claim 13, wherein the training subsystem is further configured to train the machine learning model by at least one of:
receiving one or more training datasets associated with the one or more electronic mail feature scores, from the electronic mail feature score computing subsystem;
performing forward passes with one or more initial weightages by processing one or more training datasets associated with the one or more electronic mail feature scores, through the machine learning model to compute the one or more first user electronic mail scores for each specified interval of the contact prediction window;
executing one or more loss functions comprising at least one of: mean squared error and mean absolute error to determine a difference between the computed one or more first user electronic mail scores and actual one or more first user electronic mail scores;
computing gradient of one or more losses for the one or more initial weightages of each electronic mail feature score of the one or more electronic mail feature scores;
updating the one or more initial weightages of each electronic mail feature score of the one or more electronic mail feature scores based on the gradient of one or more losses and a learning rate, wherein the learning rate is determined at a time of training the machine learning model, and wherein the learning rate is a hyperparameter in a context of one or more gradient descent rules for training the machine learning model;
repeating a process of at least of: performance of the forward passes, the computation of the gradient of one or more losses, updating of the one or more initial weightages, until the convergence is achieved; and
determining the one or more weightages of each electronic mail feature score of the one or more electronic mail feature scores for the one or more parameters of the machine learning model.

15. The machine-learning based (ML-based) computing system of claim 9, wherein the training subsystem is further to re-train the machine learning model over a plurality of time intervals based on one or more training data, and wherein in re-training the machine learning model over the plurality of time intervals, the training subsystem is configured to:
receive the one or more training data associated with at least one of: the one or more optimal times and the prioritized list of the one or more optimal times, from the output subsystem;

adding the one or more training data with the one or more training datasets to generate one or more updated training datasets comprising at least one of: first one or more data points and second one or more data points;

re-training the machine learning model to update the one or more weightages by performing the process of at least one of: the performance of the forward passes, the computation of the gradient of one or more losses, updating of the one or more initial weightages, until the convergence is achieved; and executing the re-trained machine learning model in the first user electronic mail score computing subsystem to compute the one or more first user electronic mail scores for each specified interval of the contact prediction window over the plurality of time intervals.

16. The machine-learning based (ML-based) computing system of claim 9, wherein the one or more data associated with the first one or more users and the second one or more users, are extracted from the one or more databases based on one or more techniques comprising at least one of: data normalization, data anonymization, data aggregation, data analysis, and data storage; and wherein the one or more databases comprises at least one of: one or more relational databases, one or more object-oriented databases, one or more data warehouses, and one or more cloud-based databases.

17. A non-transitory computer-readable storage medium having instructions stored therein that when executed by a hardware processor, cause the processor to execute operations of:

receiving one or more inputs from a second one or more users, wherein the one or more inputs comprises information related to at least one of: one or more entities associated with a first one or more users, and a contact prediction window associated with a predefined time duration during which the second one or more users requires an optimal instance for a communication with the first one or more users;

extracting one or more data associated with the first one or more users and the second one or more users from one or more databases, based on the one or more inputs received from the second one or more users;

computing one or more electronic mail feature scores based on the extracted one or more data associated with the first one or more users and the second one or more users, for each specified interval of the contact prediction window, wherein the one or more electronic mail feature scores comprises at least one of: incoming electronic mail score, outgoing electronic mail score, first user activity score, electronic mail productivity rate score, quarterly electronic mail productivity rate score, and incoming electronic mail ratio score;

validating, the machine learning model based on one or more validation datasets, wherein in validating the machine learning model comprises determining whether the machine learning model is trained until one or more losses reaches a stable state indicating a state of convergence is achieved;

computing one or more first user electronic mail scores for each specified interval of the contact prediction window based on the one or more electronic mail feature scores for each specified interval of the contact prediction window, using a machine learning model;

computing at least one of: the one or more optimal times and a prioritized list of the one or more optimal times by ranking each specified interval of the contact prediction window associated with the one or more first user electronic mail scores;

providing an output of at least one of: the one or more optimal times and the prioritized list of the one or more optimal times to the second one or more users on a user interface associated with one or more electronic devices; and transmitting one or more electronic mails to the first one or more users by scheduling the one or more electronic mails during the one or more optimal times.

18. The non-transitory computer-readable storage medium of claim 17, wherein computing, using the machine learning model, the one or more first user electronic mail scores for each specified interval of the contact prediction window based on the one or more electronic mail feature scores, comprises:

determining one or more weightages for each electronic mail feature score of the one or more electronic mail feature scores using the machine learning model, wherein the machine learning model comprises a gradient descent based machine learning model;

assigning the determined one or more weightages to the one or more electronic mail feature scores;

aggregating the assigned one or more weightages to the one or more electronic mail feature scores to compute the one or more first user electronic mail scores for each specified interval of the contact prediction window.

* * * * *